US006596254B1

United States Patent
Nenoff et al.

(10) Patent No.: US 6,596,254 B1
(45) Date of Patent: Jul. 22, 2003

(54) NIOBATE-BASED OCTAHEDRAL MOLECULAR SIEVES

(75) Inventors: Tina M. Nenoff, Albuquerque, NM (US); May D. Nyman, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 143 days.

(21) Appl. No.: 09/876,903

(22) Filed: Jun. 8, 2001

Related U.S. Application Data
(60) Provisional application No. 60/211,240, filed on Jun. 12, 2000.

(51) Int. Cl.[7] .............................................. C01G 33/00
(52) U.S. Cl. ................. 423/593.1; 423/598; 423/594.8; 423/65
(58) Field of Search ........................... 423/593, 594.8, 423/65, 598, 593.1

(56) References Cited

U.S. PATENT DOCUMENTS

| | | |
|---|---|---|
| 5,518,707 A | 5/1996 | Bedard et al. |
| 5,681,973 A | 10/1997 | Hoelderich et al. |
| 5,702,674 A | 12/1997 | O'Young et al. |
| 5,976,490 A | 11/1999 | Wendelbo |

OTHER PUBLICATIONS

Goiffon, et al., Structure cristalline du niobate . . . , Revue de Chimie minerale, 1980, 17, 466.*
Dale, et al., The Heteropoly–12–niobomanganate(IV) Anion, Chemical Comm., 1967, 792.*
Nyman, et al., "A New Family of Octahedral Molecular Sieves: Sodium Ti/Zr$^{IV}$ Niobates", J. of Am. Chem. Soc. 2001, 123, 1529–1530, no month.

Nyman, et al., Synthesis, Characterization and Ion Exchange of New Na/Nb/M$^{4+}$/O/H$_2$O(M–Ti,Zr) Phases, *Metal Separation Technologies Beyond 2000: Integrating Novel Chemistry with Processing*, TMS The Minerals, Metals & Materials Society proceedings of symposium, Kahuku, Oahu, Hawaii, Jun. 13–18, 1999.

* cited by examiner

Primary Examiner—Steven Bos
(74) Attorney, Agent, or Firm—Kevin W. Bieg

(57) ABSTRACT

Niobate-based octahedral molecular sieves having significant activity for multivalent cations and a method for synthesizing such sieves are disclosed. The sieves have a net negatively charged octahedral framework, comprising niobium, oxygen, and octahedrally coordinated lower valence transition metals. The framework can be charge balanced by the occluded alkali cation from the synthesis method. The alkali cation can be exchanged for other contaminant metal ions. The ion-exchanged niobate-based octahedral molecular sieve can be backexchanged in acidic solutions to yield a solution concentrated in the contaminant metal. Alternatively, the ion-exchanged niobate-based octahedral molecular sieve can be thermally converted to a durable perovskite phase waste form.

14 Claims, 4 Drawing Sheets

NIOBATE-BASED OCTAHEDRAL MOLECULAR SIEVES

BENEFIT OF PROVISIONAL APPLICATION

This application claims the benefit of Provisional Application No. 60/211,240, filed Jun. 12, 2000.

STATEMENT OF GOVERNMENT INTEREST

This invention was made with Government support under contract no. DE-AC04-94AL85000 awarded by the U. S. Department of Energy to Sandia Corporation. The Government has certain rights in the invention.

BACKGROUND OF THE INVENTION

The present invention relates to inorganic molecular sieves, and more particularly to niobate-based octahedral molecular sieves (OMS) and methods for synthesizing such sieves and use thereof for contaminant removal.

Microporous inorganic materials have many industrial applications including ion, molecule, and gas separations; ion, molecule and gas sensing; and catalysis. Applications for microporous materials for metal ion separations include radionuclide separation from nuclear waste streams (e.g., $^{137}Cs$, $^{90}Sr$, $^{60}Co$), separation of transition metals from metallurgical wastes (e.g., Cr, Ni, Zn), and cleanup of heavy, toxic metals (e.g., Pb, Hg, Cd). See, e.g., U.S. Pat. No. 5,976,490 to Wendelbo, et al. (1999). Effective ion exchangers require properties such as high selectivity in variable chemical environments; radiation, chemical and thermal stability; and reusability through back-exchange.

In particular, the long-term storage, containment, and handling of radioactive strontium-90, cesium-137 and actinides in nuclear waste streams pose substantial engineering, scientific, and societal challenges. The wastes containing these radionuclides are multi-component and multi-phasic. Therefore, effective ion exchangers for removal of the radionuclides must exclude competing species, such as high concentrations of Na+ and other cations within the mixed wastes. Furthermore, appropriate ion exchangers must function in harsh chemical conditions and withstand extreme radiation environments created by absorbed radionuclides. Finally, the radionuclide-loaded ion exchanger should ideally be convertible to a stable, ceramic waste form.

Additionally, molecular sieves can be used to remove, isolate, and/or purify industrial contaminant metals, such as cobalt, nickel, and zinc.

In addition to the more common aluminosilicate sieves, many unique classes of tetrahedral framework, microporous materials useful for ion exchange have been synthesized including the phosphates, germanates, and arsenates. Additionally, microporous, octahedral framework structures such as molybdates, vanadates, and tungstates, and manganates have been shown to be useful ion exchangers. See, e.g., U.S. Pat. No. 5,518,707 to Bedard, et al. (1996); U.S. Pat. No. 5,681,973 to Hoelderich, et al. (1997); and U.S. Pat. No. 5,702,674 to Young, et al. (1997). Relatively few niobium- or tantalum-containing ion exchangers have been reported.

There still exist challenging ion selectivity problems including ion extraction from a highly acidic medium; separation of two ions which have very similar size or chemical behavior; back-exchange of ions, or reuse of ion exchangers; development of ion exchangers with extremely high ion exchange capacities for maximum efficiency; and prediction of ion selectivities of exchangers based on their structural properties.

SUMMARY OF THE INVENTION

The present invention comprises a niobate-based OMS having an octahedral framework wherein a portion of the niobium present in the framework is substituted by another octahedrally coordinated lower valence transition metal. A niobate-based OMS having an exchangeable alkali cation, such as sodium, can be synthesized by mixing a niobium alkoxide with a octahedrally coordinated lower valence transition metal alkoxide to form an alkoxide mixture; adding the alkoxide mixture to an alkali-containing solution to form a sol mixture; heating the sol mixture to form a reaction product in a parent solution; and separating the reaction product from the parent solution.

The niobate-based OMS having an exchangeable alkali cation can be used to remove a contaminant metal ion from a contaminated solution by exchanging the alkali cation for the contaminant metal ion. The contaminant metal ion-exchanged niobate-based OMS can then be backexchanged to concentrate the contaminant metal ion in an acidic solution. Alternatively, the contaminant metal ion can be immobilized by heating of the ion-exchanged niobate-based OMS to form a contaminant metal-loaded perovskite.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

Figure 1:
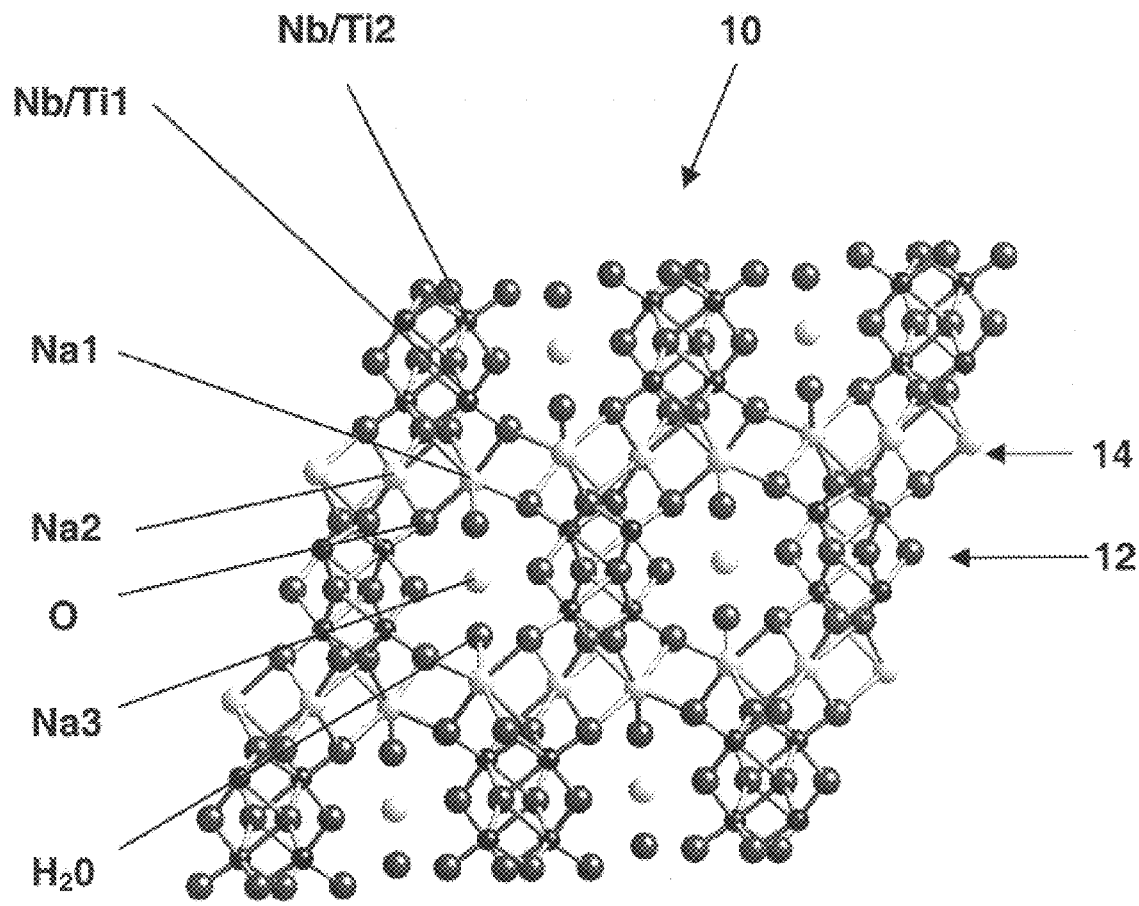
FIG. 1 shows a model of the polyhedral structure of a 20% Ti-phase, niobate-based OMS, having formulae $Na_{16}Nb_{12.8}Ti_{3.2}O_{44.8}(OH)_{3.2} \cdot 8H_2O$, projected along the b-axis.

The present invention comprises a niobate-based OMS with significant activity for multivalent cations and a method for synthesizing such sieves. The sieves have a net negatively charged $NbO_3$ octahedral framework, comprising niobium, oxygen, and transition metal elements that substitute for and have a lower valence than $Nb^V$. The framework is charge balanced by the occluded alkali cation from the synthesis method. The alkali cation can be exchanged for other ions. The sieves have particularly strong affinity and selectivity for divalent cations.

The framework topology of the niobate-based OMS is analogous to the common aluminosilicate zeolites, which substitute $Al^{III}$ for $Si^{IV}$ in a nominal $SiO_2$ tetrahedral framework, thereby imparting a net negative charge and requiring a charge-balancing cation that simultaneously promotes the formation of an open tetrahedral framework by acting as a template. Equations (1) and (2) illustrate the charge-balancing of the tetrahedral-framework aluminosili cates and the octahedral-framework titano(zircono) niobates, respectively:

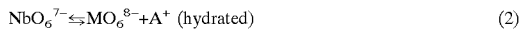

where $A^+$ is a hydrated alkali cation and M is $Ti^{IV}$ or $Zr^{IV}$.

The general chemical formula for a niobate-based OMS having titanium or zirconium as the lower valence transition metal substitute and sodium as the exchangeable cation is $Na_2Nb_{2-x}M_xO_{6-x}(OH)_x \cdot H_2O$ (x=0.04–0.4; M=Ti, Zr). The M:Nb ratio is variable with no significant structural change. Substitution of the $Ti^{IV}$ or $Zr^{IV}$ oxide into a $Nb^V$ oxide framework imparts a net negative charge to the lattice. The hydrated sodium cation functions to balance the negatively charged framework, simultaneously promoting the growth of an open octahedral framework structure. Sodium atoms occupying octahedral framework sites can be selectively exchangeable for divalent cations. The niobate-based OMS can be synthesized hydrothermally. Both the as-synthesized and exchanged forms of the niobate-based OMS undergo direct conversion to a perovskite-type phase at elevated temperature.

Removal of $^{90}Sr^{2+}$ from contaminated groundwater or nuclear waste. solutions by sorption into niobate-based OMS followed by direct thermal conversion to a durable perovskite phase waste form enables a reliable method for $^{90}Sr^{2+}$ cleanup.

Furthermore, niobate-based OMS can be used for the removal and clean up of metals, such as those controlled by the Resource Conservation and Recovery Act (e.g., $Co^{2+}$, $Ni^{2+}$, $Zn^{2+}$), from contaminated groundwater, soil plumes, or industrial organic solutions. The contaminant metal ion can be electively adsorbed and captured in the sieve. The contaminant metal ion-exchanged sieve can be backexchanged with acidic solutions. The contaminant metal can therefore be purely separated and either disposed of or industrially reused.

Synthesis of the Niobate-Based Octahedral Molecular Sieves

The niobate-based OMS can be synthesized by hydrothermal treatment of extremely basic sol mixtures containing water, alkali hydroxide, and hydrolyzed transition metal alkoxides. A niobium alkoxide can be mixed with an octahedrally coordinated lower valence transition metal alkoxide to form an alkoxide mixture. The alkoxide mixture can be added to an alkali-containing solution to form a sol mixture. The sol mixture can be heated at elevated temperature for an extended period of time to form a reaction product in a parent solution. The reaction product can be separated from the parent solution to yield the niobate-based OMS having an exchangeable alkali cation. Isostructural, pure phase sieves can be formed with the M:Nb ratio directly correlated with the precursor ratio for a range of about 1:50–1:4 M:Nb.

In one embodiment of the invention, precursor alkoxides of niobium (V) ethoxide {$Nb(OC_2H_5)_5$} (0.71 g, 2.2 mmol) and either titanium (IV) isopropoxide {$Ti(OC_3H_7)_4$} (0.16 g, 0.56 mmol) or zirconium (IV) isopropoxide {$Zr_2(OC_3H_7)_8$ $(HOC_3H_7)$} (0.22 g, 0.56 mmol) can be combined in an air-tight vial in an inert atmosphere box, removed from the box, and ultrasounded to obtain a homogeneous mixture of the alkoxides. Sodium hydroxide {NaOH} (1.34 g, 33.6 mmol) can be dissolved in water by stirring in a 23 ml teflon-lined stainless steel reactor vessel. Concurrently, the alkoxide mixture can be added and stirring continued for 30 minutes, followed by addition of more water. For the synthesis of the niobate-based OMS with less than 20% substitution of Ti or Zr for Nb, the addition of a chelating agent, such as a β-diketonate, can prevent the formation of perovskite. The mixture can be stirred for thirty more minutes. The resulting sol mixture can be heated in the reactor for 5–7 days at 100–175° C. The precipitated reaction product can be separated from the parent solution by vacuum filtration, washed with deionized water, and dried in air. Approximately 0.3 g of white, microcrystalline reaction product can be collected.

Scanning electron microscopy and reflected light microscopy of the reaction product revealed that the sieves were synthesized with no visible impurity phases or amorphous impurities, and the crystals were ~1×10–50 $\mu$m fibers.

Analyses by atomic absorption spectroscopy (AAS), direct coupled plasma spectroscopy (DCP) and thermogravimetric analysis/differential thermal analysis (TGA/DTA) of the Ti- and Zr-containing reaction products, synthesized according to the method described above, gave formulae of $Na_3Nb_3TiO_{11} \cdot 3H_2O$ and $Na_7Nb_7ZrO_{23} \cdot 6H_2O$, respectively. Powder X-ray diffraction spectra of the two sieves revealed that they were isomorphous. Identical structures were obtained from different ratios of M:Nb, indicating that the titanium or zirconium atoms substitute isostructurally for niobium.

FIG. 1 shows a model of the polyhedral structure 10 for a 20% Ti-phase sieve (1:4 Ti:Nb) determined by analytical and spectroscopic analysis. The model shows a 3-dimensional framework with 1-dimensional channels oriented parallel to the b-direction. In the chemically constrained model, 3.2Ti and 12.8Nb atoms per unit cell distribute statistically over two crystallographically independent Nb/Ti sites Nb/Ti1, Nb/Ti2. Occupancies of the octahedrally coordinated Na1 and Na2 sites and the square planar Na3 site are fixed at full occupancy consistent with 5:4:1 Na:Nb:Ti ratio observed by chemical analysis. The double chains containing disordered Nb/Ti-centered octahedra 12 are connected to two layers of six coordinated Na-centered polyhedral 14. Water $H_2O$ and oxygen O comprise the remainder of the structure 10.

Contaminant Removal with Niobate-Based Octahedral Molecular Sieves

Niobate-based OMS can be used to remove contaminant metal ions from a contaminated solution. The niobate-based OMS having an exchangeable alkali cation can be added to the contaminated solution containing the contaminant metal ion. The alkali cation can be exchanged for the contaminant metal ion to form a contaminant metal ion-exchanged niobate-based OMS and a contaminant-depleted solution. The contaminant metal ion-exchanged niobate-based OMS can then separated from the contaminant-depleted solution.

Ion selectivity experiments were carried out to determine the contaminant metal removal effectiveness of the niobate-based OMS using the following general procedure. 0.05 g of the as-synthesized sieve was added to a 10 ml solution that contained 50 ppm of the contaminant metal ion of interest (e.g., Sr). The sieve was shaken with the contaminant-containing solution at 300 rpm in a capped 20 ml vial for 20 hrs at room temperature to yield an ion-exchanged sieve enriched in the contaminant metal ion and an a solution depleted in the contaminant metal ion. The contaminant metal ion-depleted solution was filtered using a syringe filter, such as Whatman's 0.02 $\mu$m ANOTOP™ syringe filter. The ion-depleted solution was diluted and analyzed for the contaminant metal ion of interest by AAS, using standards containing the same matrix elements as the solution. Nitrate salts were used for both the contaminant metal ions for selectivity studies and the competing alkali cations (e.g., Na). Solutions for the pH dependent selectivity experiments were made with constant sodium content using combinations of $HNO_3$, $NaNO_3$ and NaOH to obtain a range of pH.

Maximum contaminant metal ion loading of the as-synthesized sieves was carried out by shaking the sieve with a 1 molar solution of the contaminant metal nitrate for ion exchange at room temperature for 6–20 hours at 300 rpm. The ion-exchanged sieve was removed from the solution by filtration and washed with 3000 ml hot water. This process was repeated twice. The percent loading was determined by AAS analysis of the ion-exchanged sieve.

The distribution coefficients of a series of monovalent, divalent and trivalent metals for the 20% Ti-phase sieve are listed in Table I, where $K_d$ is the ratio of metal absorbed onto the 20% Ti-phase sieve to the metal remaining in the ion-depleted solution. In general, this 20% Ti-phase sieve is highly selective for divalent cations over monovalent cations. The multivalent transition metals as well as $Ba^{2+}$ and $Sr^{2+}$ are completely removed from solution by the 20% Ti-phase sieve.

TABLE I

Distribution Coefficients for Metals on the 20% Ti-Phase Sieve

| Cation | $K_d$ (ml/g)§ |
|---|---|
| $La^{3+}$ | >199,800** |
| $Sr^{2+}$ | >99,800* |
| $Pb^{2+}$ | >99,800* |
| $Ba^{2+}$ | >99,800* |
| $Zn^{2+}$ | >99,800* |
| $Cd^{2+}$ | >99,800* |
| $Co^{2+}$ | >99,800* |
| $Cr^{3+}$ | >99,800* |
| $Ni^{2+}$ | >99,800* |
| $Ca^{2+}$ | 2,300 |
| $Mg^{2+}$ | 226 |
| $Cs^+$ | 150 |
| $K^+$ | 95 |
| $Li^+$ | 8 |

§Calculated for detection limit of metal:
*0.1 ppm
**0.05 ppm

Concentration of the Sequestered Contaminant Metal Ion by Backexchange

The sequestered contaminant metal ion can be removed and concentrated in solution by backexchanging the ion-exchanged sieve in an acidic solution.

The much lower selectivity for the divalent cations $Ca^{2+}$ and $Mg^{2+}$ can be beneficial in natural environments, such as soil plumes, that are contaminated with metals controlled by the Resource Conservation and Recovery Act (RCRA), codified at 42 U.S.C. §§6901–6987, 9001–9010. The relative difference in selectivity enables the contaminated soil to be purified and the RCRA contaminant metal isolated. This is because RCRA metal contaminants (e.g., $Co^{2+}$, $Ni^{2+}$, $Zn^{2+}$) will still be selectively absorbed by the molecular sieve in spite of the more abundant, naturally occurring $Ca^{2+}$ and $Mg^{2+}$. The sequestered RCRA metal ion can subsequently be removed from the ion-exchanged sieve by backexchanging in acidic solutions, such as HCl or $HNO_3$. The RCRA metal ion can be replaced by $2H^+$ from the acidic solution to yield a concentrated solution of the RCRA metal that can be disposed of or industrially reused.

Immobilization of the Contaminant Metal

The contaminant metal can be immobilized by heating the contaminant metal ion-exchanged niobate-based OMS to an elevated temperature to form a durable, contaminant metal-loaded perovskite. Sequestration and immobilization of radioactive $^{90}Sr$ can be of particular interest for cleanup of nuclear wastes. To further investigate the ion exchange behavior of the Ti-phase sieve, extensive measurements of Sr selectivity were carried out.

Figure 2:
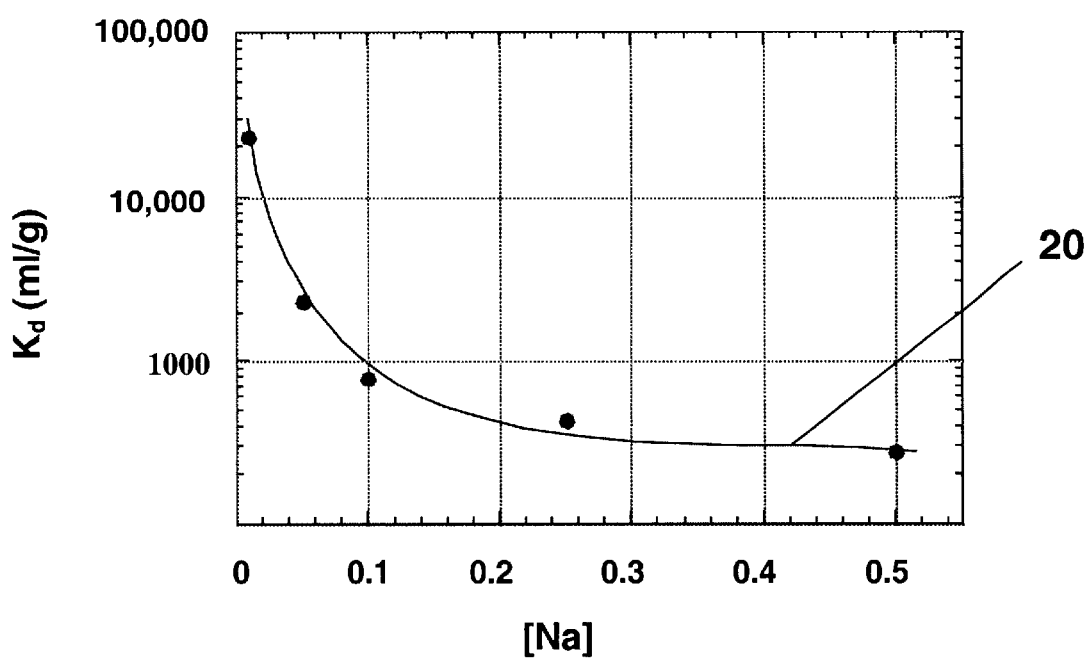
FIG. 2 shows the selectivity for Sr on the 20% Ti-phase sieve as a function of sodium concentration in the solution.

FIG. 2 shows a plot 20 of distribution coefficients for Sr on the 20% Ti-phase sieve as a function of Na concentration as a competing ion. The ratio of Na:Sr ranges from 20:1–1000:1, so that Na is always present in a large excess. With all concentrations of Na, Sr is selectively adsorbed, but selectivity decreases with increasing Na concentration. At lower Na concentrations (<0.1 M Na), the $K_d$ values approach $10^6$ ml/g, which is the value obtained for approximately 0.1 ppm Sr remaining in solution, the detection limit of the Sr with the AAS analytical technique.

Figure 3:
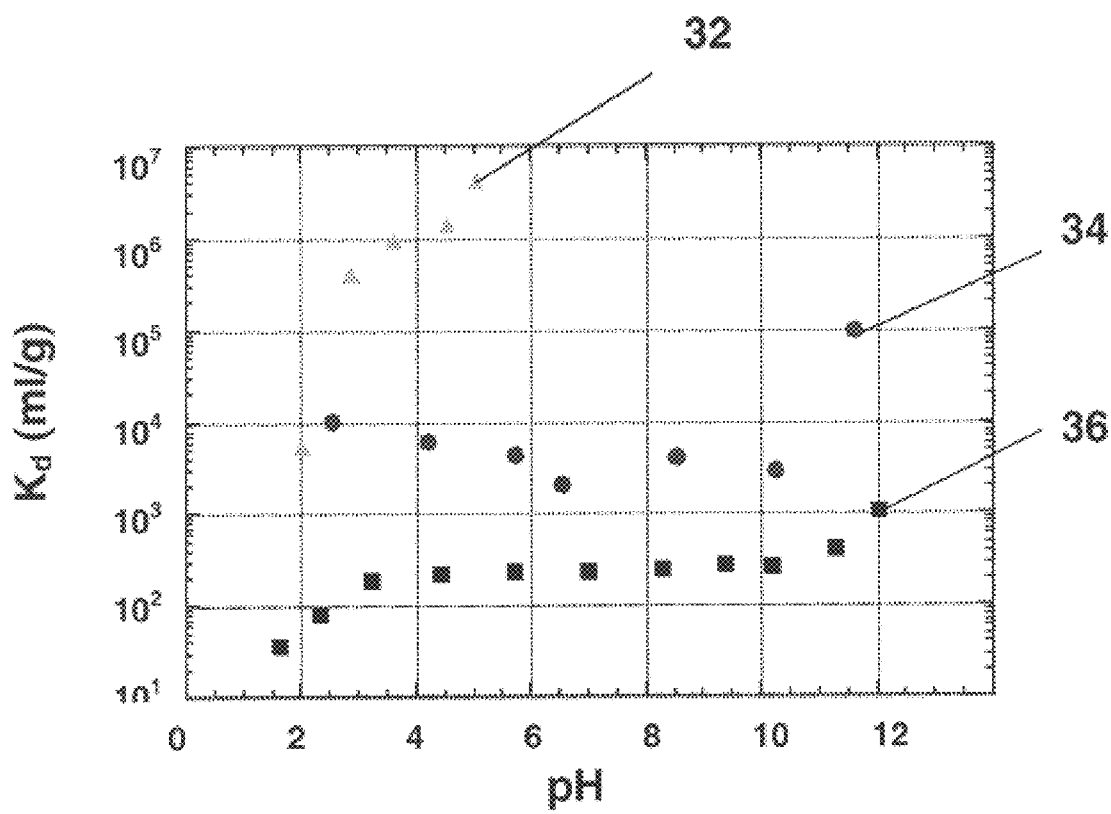
FIG. 3 shows the selectivity for Sr on the 20% Ti-phase sieve as a function of pH of the solution, with different concentrations of Na as a competing cation.

FIG. 3 shows the distribution coefficient of Sr on the 20% Ti-phase sieve as a function of pH with no sodium in the solution 32 and with sodium as the competing ion for 0.01 M Na 34 and 0.1 M Na 36. Sr selectivity increases with decreasing Na and increasing basicity (decreasing $H^+$ concentration). With no sodium in the solution, Sr was no longer detected in a solution of pH=5. Some selectivity for Sr is still observed at pH=2. This behavior is typical of inorganic ion exchangers in aqueous solutions. At low pH, the anionic framework preferentially takes up $H^+$ from the acidic solution over the larger metal cations. Conversely, as the pH increases and the $H^+$ concentration decreases, the molecular sieve absorbs metal cations.

The general formula for Sr-exchanged niobate-based molecular sieve is $Na_{2-y}Sr_yNb_{2-x}M_xO_{6-x}(OH)_x \cdot H_2O$ (y=0–0.4; x=0.04–0.4; M=Ti, Zr). Maximum Sr-loading of the Ti- and Zr-phase sieves gives a 1:1 ratio of $Sr^{2+}:M^{IV}$ and indicates that $Sr^{2+}$ exchanges monatomically for $Na^+$. The chemical formula for the maximum ion-exchanged 20% Ti-phase sieve is $Na_{12.8}Sr_{3.2}Nb_{12.8}Ti_{3.2}O_{48} \cdot 8H_2O$. X-ray spectra of the Sr-exchanged sieves show changes in relative peak intensities, but no peak shifts from the as-synthesized sieve. This indicates that the ion exchange takes place without any phase change or framework distortion.

Figure 4:
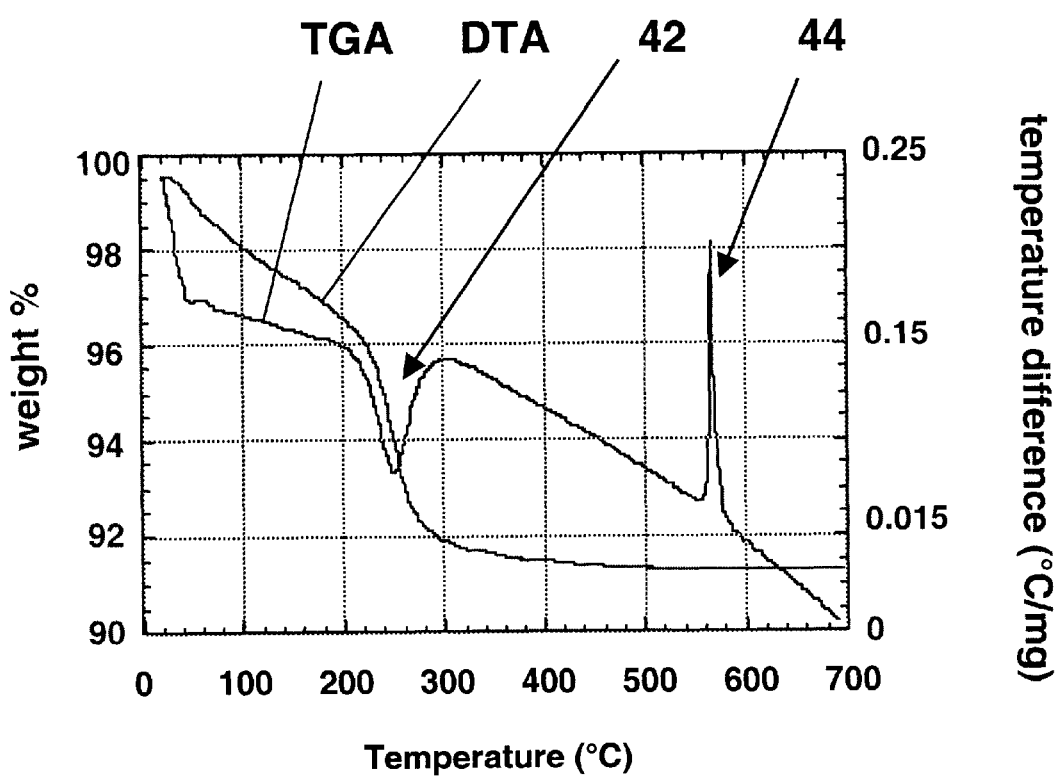
FIG. 4 shows a TGA/DTA spectrum of the Sr-exchanged 20% Ti-phase sieve.

FIG. 4 shows the TGA/DTA spectra TGA, DTA of the Sr-exchanged 20% Ti-phase sieve. These spectra indicate an endothermic water loss around 250° C. 42, followed by an exothermic phase transition at 550° C. 44. Analysis of the thermal decomposition product by X-ray diffraction and elemental analysis reveals that the phase transition is a perovskite of the form $Na_xSr_yNb_xM_yO_{3(x+y)}$. Scanning electron microscopy/energy dispersive spectroscopy analysis of the crystalline perovskite shows that the composition is homogeneous.

Micrographs of the Sr-exchanged Ti-phase sieve and the Sr-loaded perovskite, formed by thermal phase transition of the Sr-exchanged Ti-phase, indicate that the two phases have an identical needle-like morphology. The perovskite morphology observed is preserved from the morphology of the Sr-exchanged Ti-phase, indicating that the phase change occurs with minimal morphological change. This morphological preservation and the low temperature required for this phase change indicate that remobilization of the strontium during heating is unlikely.

Phase alteration of the Sr-exchanged sieves can be an interesting property with regard to radioactive nuclide (i.e., $^{90}Sr$) immobilization. These niobate-based OMS selectively remove $Sr^{2+}$ from solution and sorb the necessary amount so that subsequent thermal dehydration and phase alteration produce a stable perovskite phase material. Perovskite exhibits near- and long-term chemical and radioactive stability, and is a major component of the well-known SYNROC™, a commercialized ceramic waste form for high level radioactive waste storage.

It will be understood that the above description is merely illustrative of the applications of the principles of the present invention. Other variations and modifications of the invention will be apparent to those of skill in the art.

We claim:

1. A niobate-based octahedral molecular sieve comprising an octahedral framework structure wherein a portion of the niobium present in the framework is substituted by another octahedrally coordinated lower valence transition metal.

2. The niobate-based octahedral molecular sieve of claim 1, wherein the octahedrally coordinated lower valence transition metal comprises a Group IV transition metal.

3. The niobate-based octahedral molecular sieve of claim 2, wherein the Group IV transition metal is selected from the group consisting of titanium and zirconium.

4. The niobate-based octahedral molecular sieve of claim 1, further comprising at least one exchangeable alkali cation in the octahedral framework of the sieve.

5. The niobate-based octahedral molecular sieve of claim 4, wherein the exchangeable alkali cation is sodium.

6. A method for synthesizing a niobate-based octahedral molecular sieve having an exchangeable alkali cation, comprising the steps of:

mixing a niobium alkoxide with an octahedrally coordinated lower valence transition metal alkoxide to form an alkoxide mixture;

adding the alkoxide mixture to an alkali-containing solution to form a sol mixture;

heating the sol mixture to form a reaction product in a parent solution; and separating the reaction product from the parent solution to yield the niobate-based octahedral molecular sieve having an exchangeable alkali cation.

7. The method of claim 6, wherein the alkali cation comprises sodium.

8. The method of claim 6, wherein the niobium alkoxide comprises niobium (V) ethoxide.

9. The method of claim 6 wherein the octahedrally coordinated lower valence transition metal alkoxide comprises a Group IV transition metal alkoxide.

10. The method of claim 9, wherein the Group IV transition metal alkoxide is selected from the group consisting of titanium (IV) isopropoxide and zirconium (IV) isopropoxide.

11. The method of claim 6, wherein the alkoxide mixture comprises niobium (V) ethoxide and 2–20 mole % titanium (IV) isopropoxide.

12. The method of claim 6, wherein the alkoxide mixture comprises niobium (V) ethoxide and 2–14 mole % zirconium (IV) isopropoxide.

13. The method of claim 6, wherein the alkali-containing solution comprises sodium hydroxide dissolved in water.

14. The method of claim 6, wherein the heating step comprises heating the sol mixture in a reactor vessel for a period 5 to 7 days, in a temperature range of 100–175° C.

* * * * *